United States Patent
Kuroyanagi et al.

(10) Patent No.: US 8,169,549 B2
(45) Date of Patent: May 1, 2012

(54) RECEIVER

(75) Inventors: Tatsuo Kuroyanagi, Daito (JP); Yoshiaki Fukuno, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1092 days.

(21) Appl. No.: 12/042,765

(22) Filed: Mar. 5, 2008

(65) Prior Publication Data

US 2008/0218638 A1 Sep. 11, 2008

(30) Foreign Application Priority Data

Mar. 6, 2007 (JP) .................................. 2007-055090

(51) Int. Cl.
*H04N 5/44* (2011.01)
*H04N 5/63* (2006.01)
*H04N 7/16* (2011.01)
(52) U.S. Cl. .................... 348/730; 348/725; 725/151
(58) Field of Classification Search .................... 348/730
See application file for complete search history.

(56) References Cited

U.S. PATENT DOCUMENTS

| 5,332,977 A | 7/1994 | Fritsche et al. |
| 2007/0130609 A1* | 6/2007 | Han et al. .................... 725/132 |

FOREIGN PATENT DOCUMENTS

| JP | 56-027537 A | 3/1981 |
| JP | 6-6248 A | 1/1994 |
| JP | 7-226693 A | 8/1996 |
| JP | 2002-122651 A | 4/2002 |
| JP | 2005-341362 A | 12/2005 |
| JP | 2006-54833 A | 2/2006 |

OTHER PUBLICATIONS

Japanese office Action dated Jul. 27, 2010 woth English translation (five (5) pages).

* cited by examiner

*Primary Examiner* — Dominic D Saltarelli
(74) *Attorney, Agent, or Firm* — Crowell & Moring LLP

(57) ABSTRACT

This receiver includes a receiver body having an antenna connection portion connected with an antenna, a control portion controlling the receiver body, a first internal power source provided on the receiver body for supplying power to the control portion and a second internal power source provided on the receiver body to be electrically insulated from the first internal power source for supplying power to the antenna.

14 Claims, 7 Drawing Sheets

CONTROL FLOW UPON POWER SUPPLY

RECEIVER

BACKGROUND OF THE INVENTION

1. Field of the Invention

The present invention relates to a receiver, and more particularly, it relates to a receiver comprising a receiver body connected with an antenna.

2. Description of the Background Art

A receiver comprising a receiver body connected with an antenna is known in general, as disclosed in each of Japanese Patent laying-Open Nos. 56-27537 (1981), 7-226693 (1996), 2005-341362 and 2002-122651, for example.

The aforementioned Japanese Patent laying-Open No. 56-27537 discloses an active antenna provided therein with an active circuit amplifying a received signal. This active antenna described in Japanese Patent laying-Open No. 56-27537 is so formed as to transmit power supplied to the active circuit provided therein and to transmit the received signal with one cable.

The aforementioned Japanese Patent laying-Open No. 7-226693 discloses a receiver connected with an active antenna. This received described in Japanese Patent laying-Open No. 7-226693 is so formed that power is supplied from a power source to the body of the receiver and power is also supplied to the active antenna through a network supplying power to the receiver.

The aforementioned Japanese Patent laying-Open No. 2005-341362 discloses an active antenna branching apparatus constituted of an active antenna, a branching filter and a television receiver. In this active antenna branching apparatus described in Japanese Patent laying-Open No. 2005-341362, the television receiver and the active antenna are connected with each other through the branching filter while an AC adapter for supplying power to the branching filter and the active antenna is connected to the branching filter, so that the television receiver can receive a ground wave television signal and a satellite broadcasting signal. According to the aforementioned Japanese Patent laying-Open No. 2005-341362, the branching filter is an apparatus outputting a composite signal of the ground wave television signal and the satellite broadcasting signal received in one antenna while dividing the same into the respective frequency bands.

The aforementioned Japanese Patent Laying-Open No. 2002-122651 discloses a GPS receiver operable upon connection with either an active antenna or a passive antenna. This GPS receiver described in Japanese Patent Laying-Open No. 2002-122651 is so formed that power is supplied to the active antenna through a network of the body of the receiver.

However, the aforementioned Japanese Patent Laying-Open No. 56-27537 describing the active antenna neither discloses nor suggests the structure of a network supplying power to the body of the receiver. Therefore, the network supplying power to the body of the receiver and a network supplying power to the active circuit provided in the antenna may conceivably be not electrically insulated from each other. In this case, the receiver may malfunction due to a failure caused in the active antenna when the active antenna is out of order.

In the receiver described in the aforementioned Japanese Patent Laying-Open No. 7-226693, the network supplying power to the body of the receiver and a network supplying power to the active antenna are not electrically insulated from each other. Therefore, the receiver may malfunction due to a failure caused in the active antenna when the active antenna is out of order.

In the active antenna branching apparatus described in the aforementioned Japanese Patent Laying-Open No. 2005-341362, a dedicated AC adapter (external power supply member) for operating the active antenna must be separately provided in addition to a power source supplying power to the television receiver.

The GPS receiver described in the aforementioned Japanese Patent Laying-Open No. 2002-122651 supplies power to the active antenna through the network of the body of the receiver. Therefore, a network of the GPS receiver and the network supplying power to the active antenna may not be electrically insulated from each other. In this case, the GPS receiver may malfunction due to a failure caused in the active antenna when the active antenna is out of order.

SUMMARY OF THE INVENTION

The present invention has been proposed in order to solve the aforementioned problems, and an object of the present invention is to provide a receiver capable of suppressing a malfunction caused in the body of the receiver due to a failure in an antenna when the antenna is out of order without requiring an external power supply member dedicated to the antenna.

A receiver according to a first aspect of the present invention comprises a receiver body including an antenna connection portion connected with an antenna, a control portion controlling the receiver body, a first internal power source provided on the receiver body for supplying power to the control portion and a second internal power source provided on the receiver body to be electrically insulated from the first internal power source for supplying power to the antenna.

As hereinabove described, the receiver according to the first aspect of the present invention comprises the first internal power source supplying power to the control portion and the second internal power source provided on the receiver body to be electrically insulated from the first internal power source for supplying power to the antenna so that the first internal power source for supplying power to the control portion and the second internal power source for supplying power to the antenna are electrically insulated from each other, whereby the receiver body can be prevented from a malfunction resulting from a failure in the antenna when the antenna is out of order. Further, both of the control portion of the receiver and the antenna are supplied with power from the internal power sources (the first and second internal power sources) of the receiver, whereby no external power supply member such as an AC adapter, for example, may be separately provided for supplying power to the antenna.

In the aforementioned receiver according to the first aspect, the receiver body preferably further includes a relay constituted of a coil portion and a first switching portion electrically insulated from each other, and the first internal power source is preferably connected to the coil portion of the relay while the second internal power source is preferably connected to the antenna connection portion through the first switching portion of the relay. According to this structure, the first internal power source supplies power to the control portion and the coil portion while the second internal power source supplies power to the antenna connection portion through the first switching portion. The coil portion and the first switching portion of the relay are electrically insulated from each other, whereby the receiver body can be reliably prevented from a malfunction resulting from a failure in the antenna when the antenna is out of order.

In the aforementioned receiver according to the first aspect, the receiver body preferably further includes a second switching portion provided between the first internal power source and the coil portion of the relay. According to this structure, the control portion on-off controls the second switching portion thereby controlling supply of a current from the first internal power source to the coil portion of the relay, and on-off controls the first switching portion of the relay following the current flowing to the coil portion of the relay thereby controlling supply of power from the second internal power source to the antenna through the first switching portion of the relay. Therefore, the control portion can on-off control the first switching portion of the relay by on-off controlling the second switching portion, thereby easily on-off controlling supply of power from the second internal power source to the antenna.

In the aforementioned receiver according to the first aspect, the control portion preferably has an antenna detecting function of detecting whether or not the antenna connected to the receiver body is an active antenna. According to this structure, the control portion can automatically detect that the antenna connected to the receiver body is the active antenna through the antenna detecting function.

In the aforementioned receiver according to the first aspect, the control portion preferably controls the second internal power source to supply power to the antenna through the antenna connection portion when detecting that the antenna connected to the receiver body is the active antenna through the antenna detecting function and controls the second internal power source not to supply power to the antenna connection portion when detecting that the antenna is not the active antenna or detecting that the antenna is not connected to the receiver body. According to this structure, the second internal power source supplies no power to the antenna connection portion when the control portion detects that the antenna is not the active antenna or the antenna is not connected to the receiver body, whereby power consumption can be reduced.

In the aforementioned receiver comprising the relay including the first switching portion, the first switching portion of the relay may be so formed as to enter an ON-state when the first internal power source stops supplying power to the coil portion of the relay so that the second internal power source supplies power to the antenna.

In the aforementioned receiver comprising the second switching portion, the control portion is preferably so formed as to turn off the second switching portion so that the first internal power source stops supplying the current to the coil portion of the relay thereby turning on the first switching portion of the relay so that the second internal power source supplies power to the antenna. According to this structure, the control portion can easily control whether or not to supply power from the second internal power source to the antenna by on-off controlling the second switching portion.

In this case, the control portion preferably turns on the second switching portion so that the first internal power source supplies the current to the coil portion of the relay and turns off the first switching portion of the relay so that the second internal power source stops supplying power to the antenna. According to this structure, the control portion can easily control whether or not to supply power from the second internal power source to the antenna by on-off controlling the second switching portion.

The aforementioned receiver comprising the second switching portion preferably further comprises a display portion capable of displaying television image information, and the control portion preferably turns on the second switching portion so that the first internal power source supplies the current to the coil portion of the relay and turns off the first switching portion of the relay so that the second internal power source stops supplying power to the antenna if the display portion is set to display an image other than a television image when the second internal power source supplies power to the antenna connection portion. According to this structure, the control portion can easily control the second internal power source not to supply power to the active antenna by turning on the second switching portion when setting of the display portion is so changed as not to use the active antenna for displaying an image of a DVD or the like, for example, after the same is set to display a television image.

In the aforementioned receiver comprising the second switching portion, the control portion preferably detects whether or not the antenna is the active antenna by turning off the second switching portion so that the second internal power source supplies power to the antenna every time power is supplied to the receiver body. According to this structure, the control portion can detect whether or not the antenna connected to the receive body is the active antenna every time power is supplied to the receiver body.

In this case, the control portion preferably has a receiving sensitivity detecting function of detecting whether or not the antenna connected to the receiver body is the active antenna by detecting change in receiving strength of a signal received from the antenna when turning off the second switching portion so that the second internal power source supplies power to the antenna through the first switching portion and changing the level of power supplied from the second internal power source to the antenna. According to this structure, the control portion can easily detect whether or not the antenna connected to the antenna connection portion is the active antenna by detecting change in the receiving strength of the received signal.

The aforementioned receiver having the control portion detecting whether or not the connected antenna is the active antenna by supplying power from the second internal power source to the antenna every time power is supplied to the receiver body preferably further comprises a resistance portion provided between the second internal power source and the antenna connection portion, and the control portion is preferably so formed as to turn off the second switching portion so that the second internal power source supplies power to the antenna through the first switching portion thereby supplying power of a prescribed level from the second internal power source to the antenna through the antenna connection portion and to detect whether or not the antenna is the active antenna by detecting the level of a voltage between the resistance portion and the antenna connection portion through the antenna detecting function. According to this structure, the control portion detects whether or not the antenna connected to the antenna connection portion is the active antenna through the level of the voltage detected through the antenna detecting function, thereby easily detecting whether or not the antenna connected to the antenna connection portion is the active antenna.

In this case, the control portion preferably determines that the antenna connected to the receiver body is the active antenna and maintains the second switching portion in the OFF-state so that the second internal power source supplies power to the antenna when determining that the voltage between the resistance portion and the antenna connection portion is a first voltage. According to this structure, the control portion can easily control the second internal power source to supply power to the antenna when detecting that the active antenna is connected to the receiver body.

In the aforementioned receiver having the control portion detecting whether or not the antenna is the active antenna by detecting the level of the voltage between the resistance portion and the antenna connection portion, the control portion preferably determines that the antenna connected to the receiver body is a passive antenna and turns on the second switching portion thereby controlling the second internal power source not to supply power to the antenna when determining that the voltage between the resistance portion and the antenna connection portion is the ground potential. According to this structure, the control portion can easily control the second internal power source not to supply power to the antenna when detecting that the passive antenna is connected to the receiver body.

In the aforementioned receiver having the control portion detecting whether or not the antenna is the active antenna by detecting the level of the voltage between the resistance portion and the antenna connection portion, the control portion preferably determines that the antenna is not connected to the receiver body and turns on the second switching portion thereby controlling the second internal power source not to supply power to the antenna when determining that the voltage between the resistance portion and the antenna connection portion is a second voltage. According to this structure, the control portion can easily control the second internal power source not to supply power to the antenna connection portion when detecting that the antenna is not connected to the receiver body.

A television set according to a second aspect of the present invention comprises a receiver including an antenna connection portion connected with an antenna, a control portion, a first internal power source supplying power to the control portion and a second internal power source provided to be electrically insulated from the first internal power source for supplying power to the antenna and a display portion displaying an image received by the receiver.

As hereinabove described, the television set according to the second aspect of the present invention comprises the first internal power source supplying power to the control portion and the second internal power source provided on the receiver to be electrically insulated from the first internal power source for supplying power to the antenna so that the first internal power source for supplying power to the control portion and the second internal power source for supplying power to the antenna are electrically insulated from each other, whereby the receiver can be prevented from a malfunction resulting from a failure in the antenna when the antenna is out of order. Further, both of the control portion of the receiver and the antenna are supplied with power from the internal power sources (the first and second internal power sources) of the receiver, whereby no external power supply member such as an AC adapter, for example, may be separately provided for supplying power to the antenna.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

(First Embodiment)

First, the structure of a receiver 2 according to a first embodiment of the present invention is described with reference to FIGS. 1 to 3. According to the first embodiment, the present invention is applied to the receiver 2 of a digital television 1.

Figure 1:
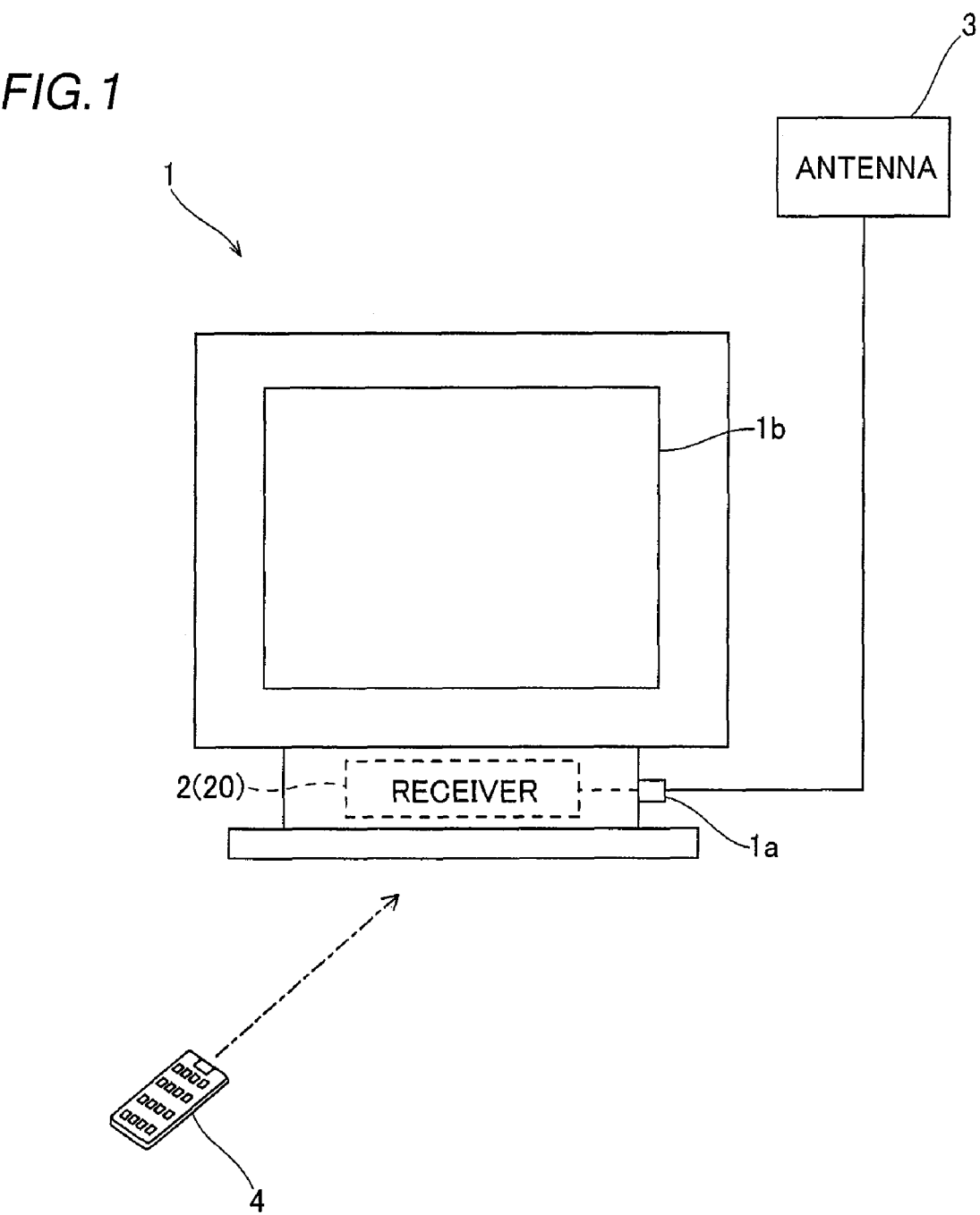
FIG. 1 illustrates the overall structure of a digital television storing a receiver according to a first embodiment of the present invention.

The receiver 2 of the digital television 1 according to the first embodiment of the present invention is stored in the digital television 1, as shown in FIG. 1. The digital television 1 is constituted of an antenna connection portion 1a connected with an antenna 3, a display portion 1b displaying information such as an image received by the antenna 3 and the receiver 2 converting a signal received by the antenna 3 to an image. The digital television 1 can be operated through a remote control 4.

Figure 2:
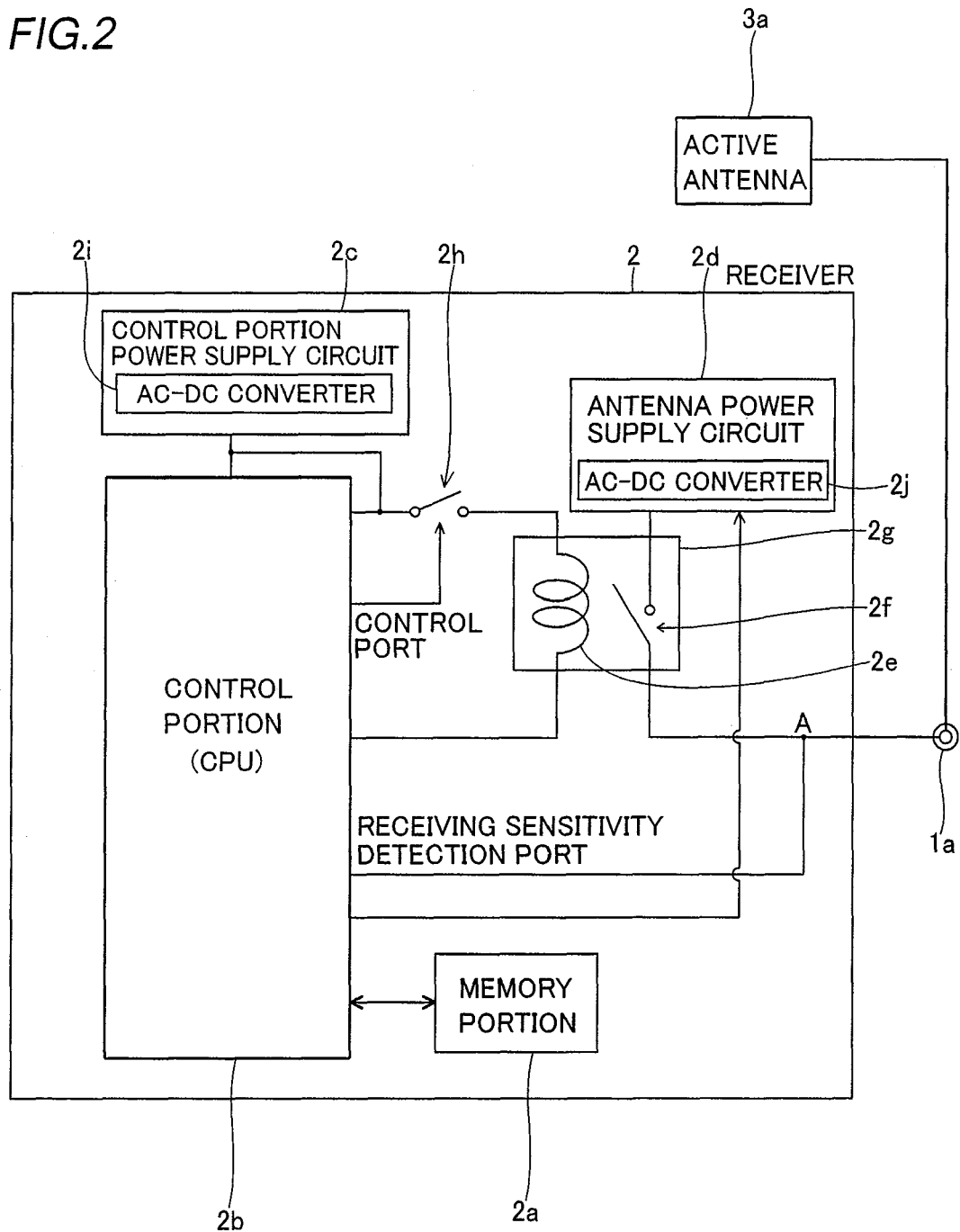
FIGS. 2 and 3 are block diagrams of the receiver according to the first embodiment of the present invention shown in FIG. 1.
Figure 3:
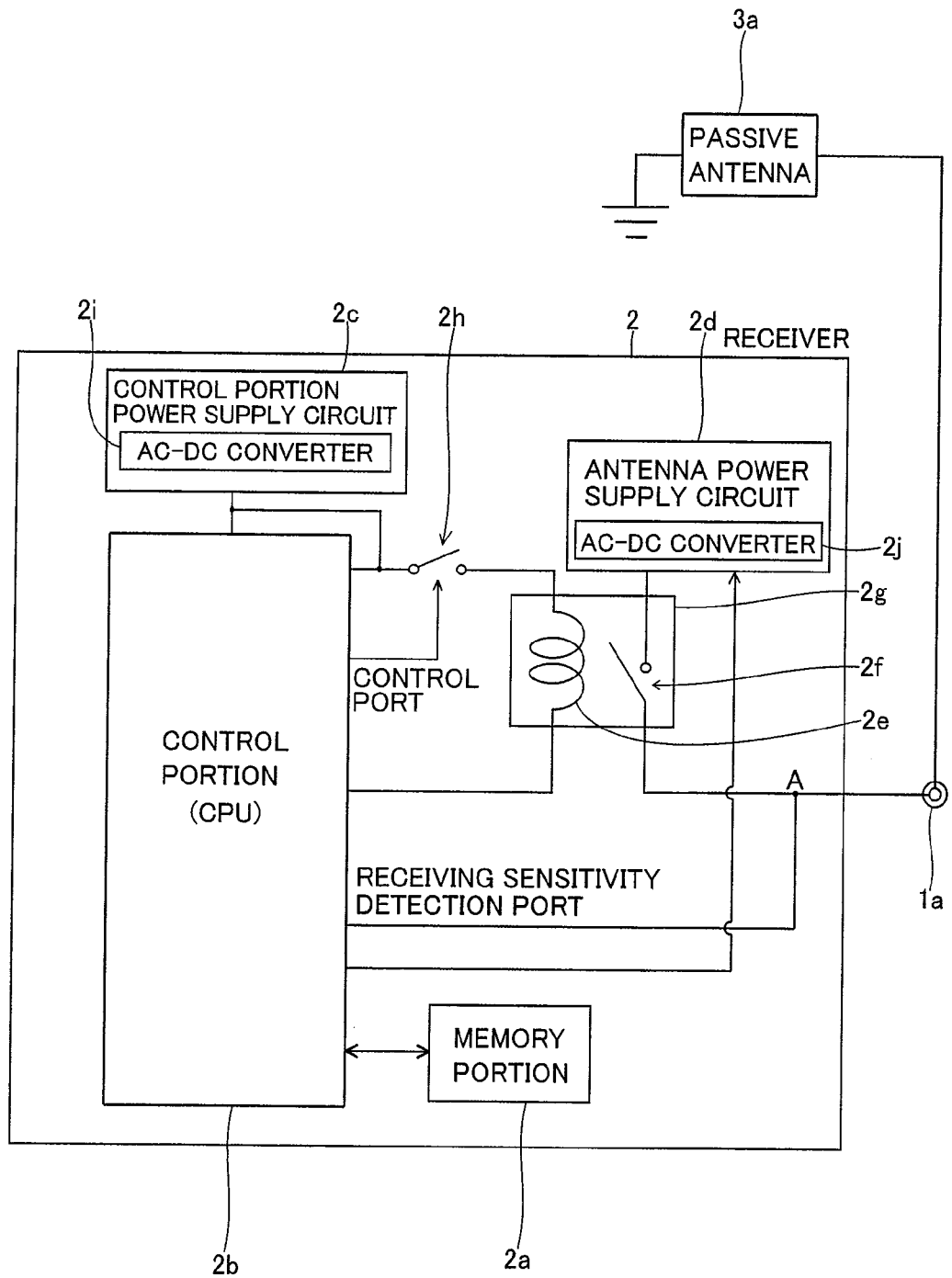

As shown in FIGS. 2 and 3, the receiver 2 according to the first embodiment is constituted of a memory portion 2a, a control portion 2b formed by a CPU, a control portion power supply circuit 2c supplying power to the control portion 2b, an antenna power supply circuit 2d supplying power to the antenna 3 (see FIG. 1), a relay 2g formed by a coil portion 2e and a switching portion 2f and a switching element 2h. The control portion power supply circuit 2c includes an AC-DC converter 2i, and the antenna power supply circuit 2d also includes an AC-DC converter 2j. FIG. 2 shows a state where an active antenna 3a is connected to the receiver 2 according to the first embodiment, and FIG. 3 shows a state where a passive antenna 3b is connected to the receiver 2 according to the first embodiment. The active antenna 3a includes an amplification circuit electrically amplifying and attenuating a received signal. The passive antenna 3b includes no amplification circuit electrically amplifying and attenuating a received signal. The control portion power supply circuit 2c and the antenna power supply circuit 2d are examples of the "first internal power source" and the "second internal power source" in the present invention respectively. The switching portion 2f and the switching element 2h are examples of the "first switching portion" and the "second switching portion" in the present invention respectively.

The control portion power supply circuit 2c is connected to both of the control portion 2b and the switching element 2h through the AC-DC converter 2i. The antenna power supply circuit 2d is connected to the switching portion 2f of the relay 2g through the AC-DC converter 2j.

According to the first embodiment, the path for supplying power from the control portion power supply circuit 2c to the control portion 2b and the path for supplying power from the antenna power supply circuit 2d to the antenna 3 are electrically insulated from each other.

The coil portion 2e of the relay 2g is formed by winding a coil on a core of a magnetic material (not shown) such as iron. A current flows to the coil portion 2e for magnetizing the magnetic material, so that the coil portion 2e energizes the switching portion 2f with the magnetic force of the magnetized magnetic material. In other words, the coil portion 2e of the relay 2g functions as an electromagnet, and the control portion 2b is so formed as to switch the switching portion 2f between an ON-state and an OFF-state by feeding the current to the coil portion 2e.

According to the first embodiment, the coil portion 2e and the switching portion 2f of the relay 2g are electrically insulated from each other, and the control portion power supply circuit 2c is connected to the coil portion 2e of the relay 2g, while the antenna power supply circuit 2d is connected to the antenna connection portion 1a through the switching portion 2f of the relay 2g. The control portion 2b and the coil portion 2e of the relay 2g are connected with each other through the switching element 2h.

The switching element 2h is set between the control portion 2b and the coil portion 2e of the relay 2g, and on-off controlled on the basis of a control signal transmitted from a control port of the control portion 2b.

The AC-DC converters 2i and 2j have functions for converting AC power sources supplied from the control portion power supply circuit 2c and the antenna power supply circuit 2d to DC power sources respectively. The control portion power supply circuit 2c and the antenna power supply circuit 2d include internal power sources respectively.

The memory portion 2a stores a control program for controlling the receiver 2 and the like.

According to the first embodiment, the control portion 2b on-off controls the switching element 2h, thereby controlling supply of the current from the control portion power supply circuit 2c to the coil portion 2e of the relay 2g. The control portion 2b is so formed as to on-off control the switching portion 2f of the relay 2g following the current flowing to the coil portion 2e of the relay 2g and to control supply of power from the antenna power supply circuit 2d to the antenna 3 (see FIG. 1) through the switching portion 2f.

A portion (node A in FIG. 2) between the switching portion 2f of the relay 2g and the antenna connection portion 1a is connected to a receiving sensitivity detecting port of the control portion 2b. The control portion 2b is so formed as to supply a control signal for controlling the antenna power supply circuit 2d to the antenna power supply circuit 2d.

According to the first embodiment, the control portion 2b has an antenna detecting function of detecting whether or not the antenna 3 (see FIG. 1) connected to the digital television 1 is the active antenna 3a. This antenna detecting function is a function of detecting whether or not the active antenna 3a is connected to the antenna connection portion 1a by detecting whether or not receiving strength of a signal received from the antenna 3 is changed at the node A when changing the level of the power supplied from the antenna power supply circuit 2d to the antenna 3 (see FIG. 1). More specifically, the control portion 2b controls the antenna power supply circuit 2d to change the level of the power supplied from the antenna power supply circuit 2d to the antenna 3 when the antenna 3 transmits the signal received therein to the receiver 2. If the antenna 3 connected to the antenna connection portion 1a is the active antenna 3a, the detected receiving strength of the received signal is changed following the change in the level of the power supplied to the antenna 3. If the connected antenna 3 is the passive antenna 3b or the antenna 3 is not connected, on the other hand, the detected receiving strength of the received signal remains unchanged. In other words, the control portion 2b is so formed as to detect that the antenna 3 connected to the antenna connection portion 1a is the active antenna 3 if the receiving strength of the received signal at the node A is changed when changing the level of the power supplied to the antenna 3. Further, the control portion 2b is so formed as to detect whether or not the antenna 3 connected to the antenna connection portion 1a is the active antenna 3a every time power is supplied to the digital television 1.

According to the first embodiment, the control portion 2b is so formed as to control the antenna power supply circuit 2d to supply power to the antenna 3 through the antenna connection portion 1a when detecting that the antenna 3 connected to the digital television 1 is the active antenna 3a through the antenna detecting function and to control the antenna power supply circuit 2d not to supply power to the antenna connection portion 1a when detecting that the antenna 3 is not the active antenna 3a or the antenna 3 is not connected to the digital television 1.

According to the first embodiment, the control portion 2b is enabled to control the antenna power supply circuit 2d not to supply power to the antenna connection portion 1a when the display portion 1b displays an image such as an image of a DVD, for example, other than a television image. Further, the control portion 2b is so formed as to control the antenna power supply circuit 2d to stop supplying power to the antenna connection portion 1a when the display portion 1b is set to display an image other than the television image while the antenna power supply circuit 2d supplies power to the antenna connection portion 1a.

An operation of the control portion 2b of the receiver 2 according to the first embodiment for controlling the relay 2g and operations of the receiver 2 according to the first embodiment upon power supply and in a power supply state are now described with reference to FIGS. 1 to 5.

First, the operation of the control portion 2b of the receiver 2 according to the first embodiment for controlling the relay 2g is described with reference to FIGS. 1 to 3.

When the antenna 3 (see FIG. 1) is supplied with power, the switching portion 2f of the relay 2g is in a closed state while the switching element 2h is kept in an open state, as shown in FIGS. 2 and 3. When the control port of the control portion 2b transmits a control signal to the switching element 2h in this state, the switching element 2h is closed. When the switching element 2h is closed, a DC current converted from an AC current by the AC-DC converter 2i flows from the control portion power supply circuit 2c to the coil portion 2e of the relay 2g through the switching element 2h. At this time, the magnetic material provided inside the coil portion 2e is magnetized as described above, whereby the coil portion 2e energizes the switching portion 2f of the relay 2g. Thus, the switching portion 2f enters an open state, so that the antenna power supply circuit 2d stops supplying power to the antenna 3.

The operations upon power supply to the receiver 2 according to the first embodiment of the present invention and in the power supply state thereof are now described with reference to FIGS. 1 to 5.

First, the operation upon power supply to the receiver 2 according to the first embodiment of the present invention is described. Before power is supplied to the receiver 2, the switching element 2h is kept in a closed state (ON-state).

Figure 4:
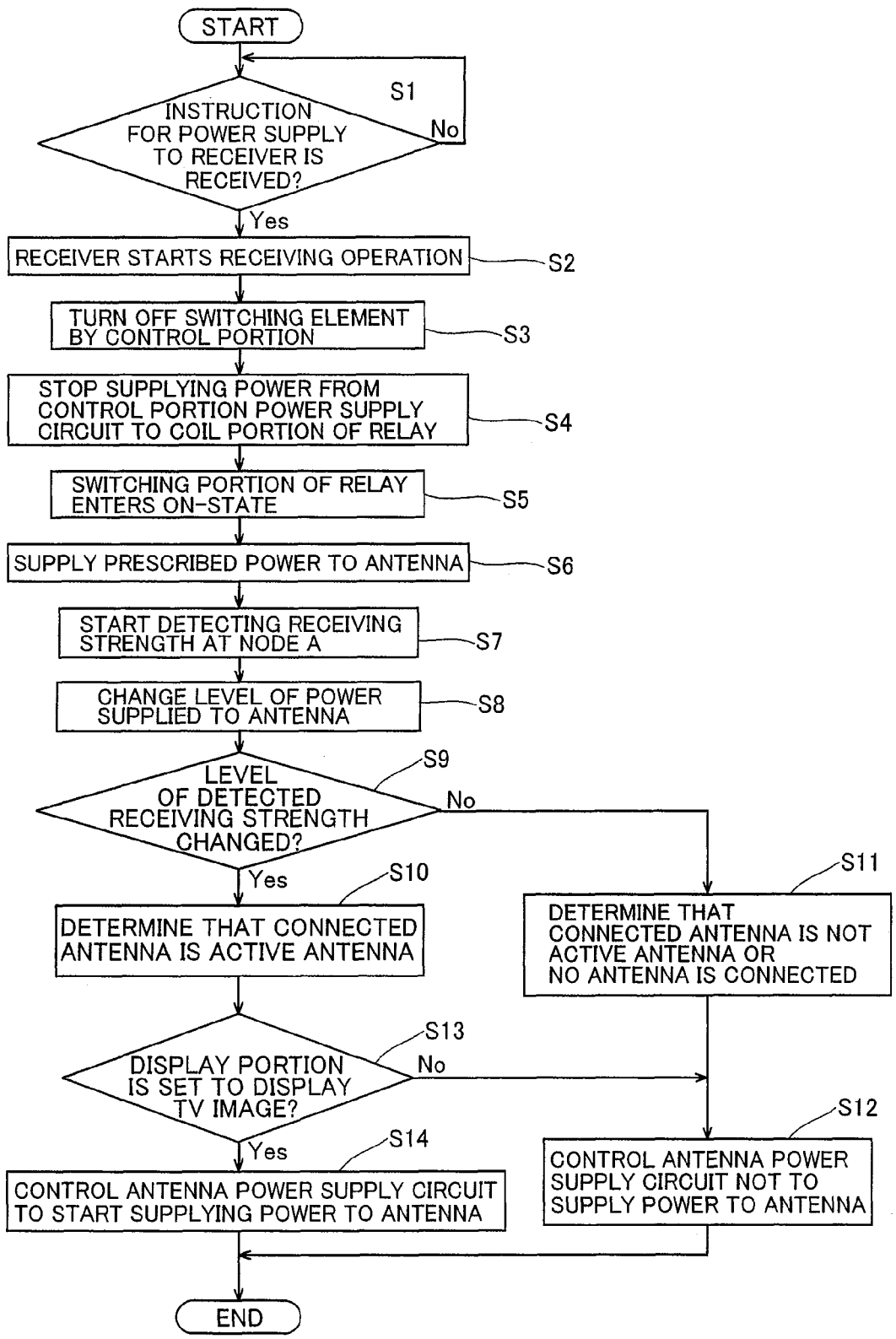
FIG. 4 is a flow chart showing a control flow upon power supply to the receiver according to the first embodiment of the present invention shown in FIG. 1.

As shown in FIG. 4, the receiver 2 (see FIG. 2) determines whether or not an instruction for power supply thereto is received from the user through the remote control 4 or the like at a step S1, and repeats this determination until power is supplied to the receiver 2. When determining that the instruction for power supply is received, the receiver 2 starts a receiving operation at a step S2. The control portion 2b turns off the switching element 2h at a step S3, so that the control portion power supply circuit 2c stops supplying the current to the coil portion 2e of the relay 2g through the switching element 2h at a step S4. At a step S5, the magnetic force generated in the coil portion 2e as the energizing force disappears due to the operation of stopping supplying the current to the coil portion 2e at the step S4, to cancel the energizing force of the coil portion 2e on the switching portion 2f. In other words, the switching portion 2f of the relay 2g enters an ON-state.

At a step S6, the antenna power supply circuit 2d supplies power consisting of a voltage of about 5 V and a current of about 30 mA to the antenna 3 through the antenna connection portion 1a, so that the antenna 3 starts a receiving operation. When receiving a signal, the antenna 3 transmits the received signal to the receiver 2. The control portion 2b advances to a step S7, and starts detecting the receiving strength of the received signal at the node A (see FIGS. 2 and 3). The control portion 2b controls the antenna power supply circuit 2d to change the level of the power supplied to the antenna 3 at a step S8, and determines whether or not the level of the receiving strength is changed following the change in the level of the power supplied to the antenna 3 at a step S9. When determining that the level of the receiving strength of the received signal is changed, the control portion 2b advances to a step S10, and determines that the connected antenna 3 is the active antenna 3a. When determining that the level of the receiving strength of the received signal remains unchanged at the step S9, on the other hand, the control portion 2b advances to a step S11, and determines that either the connected antenna 3 is not the active antenna 3a or the antenna 3 is not connected. Then, the control portion 2b advances to a step S12 for controlling the antenna power supply circuit 2d not to supply power to the antenna 3, and terminates the processing.

When determining that the connected antenna 3 is the active antenna 3a at the step S10, the control portion 2b advances to a step S13, and determines whether or not the display portion 1b is set to display a television image. In other words, the control portion 2b determines whether or not to display image information received through the antenna 3 on the display portion 1b (see FIG. 1) of the digital television 1. More specifically, the user conceivably watches the television image when the display portion 1b is set to display the television image. When the display portion 1b is not set to display the television image, on the other hand, the display portion 1b conceivably displays image information of an external device such as a DVD player, for example.

When determining that the display portion 1b of the digital television 1 is set to display the television image at the step S13 in FIG. 4, the control portion 2b controls the antenna power supply circuit 2d to start supplying power to the antenna 3 at a step S14, and terminates the processing. When determining that the display portion 1b is not set to display the television image, on the other hand, the control portion 2b controls the antenna power supply circuit 2d not to supply power to the antenna 3 at the step S12, and terminates the processing.

Figure 5:
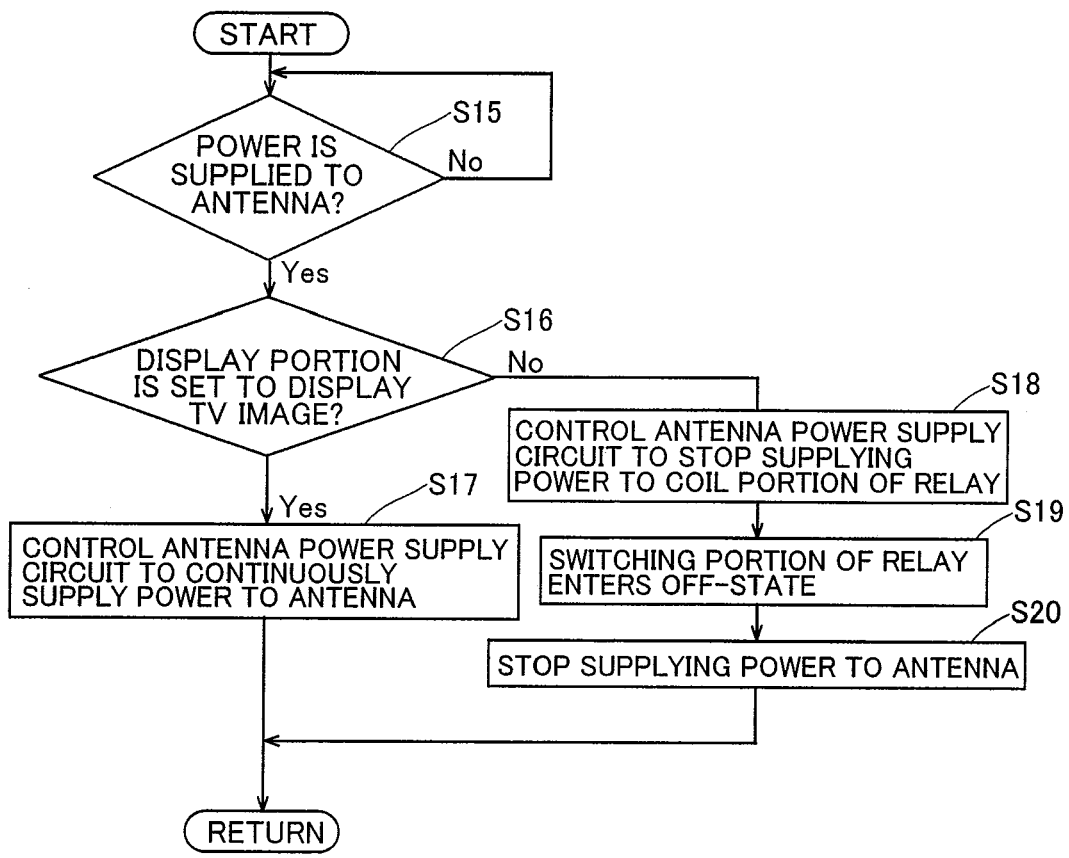
FIG. 5 is a flow chart showing a control flow in a power supply state of the receiver according to the first embodiment of the present invention shown in FIG. 1.

The operation in the power supply state of the receiver 2 according to the first embodiment of the present invention is now described. As shown in FIG. 5, the control portion 2b determines whether or not power is supplied to the antenna 3 (see FIG. 1) at a step S15. When not determining that power is supplied to the antenna 3, the control portion 2 repeats this determination until the same determines that power is supplied. When determining that power is supplied to the antenna 3, the control portion 2b determines whether or not the display portion 1b is set to display the television image at a step S16. When determining that the display portion 1b is set to display the television image, the control portion 2b advances to a step S17 and controls the antenna power supply circuit 2d to continuously supply power to the antenna 3, and returns to the initial step for repeating the operation. When determining that the display portion 1b is not set to display the television image at the step S16, on the other hand, the control portion 2b advances to a step S18, and controls the antenna power supply circuit 2d to stop supplying power to the antenna 3. When the display portion 1b is not set to display the television image in the power supply state of the receiver 2, it is conceivable that the user switches the display portion 1b to display image information of the external device such as a DVD player in an intermediate stage of watching the television image.

According to the first embodiment, as hereinabove described, the receiver 2 comprises the control portion power supply circuit 2c supplying power to the control portion 2b and the antenna power supply circuit 2d provided on the receiver 2 to be electrically insulated from the control portion power supply circuit 2c for supplying power to the antenna 3 so that the control portion power supply circuit 2c for supplying power to the control portion 2b and the antenna power supply circuit 2d for supplying power to the antenna 3 are electrically insulated from each other, whereby the receiver 2 can be prevented from a malfunction resulting from a failure in the antenna 3 when the antenna 3 is out of order. Further, both of the control portion 2b of the receiver 2 and the antenna 3 are supplied with power from the internal power sources (the internal power sources of the control portion power supply circuit 2c and the antenna power supply circuit 2d) of the receiver 2, whereby no external power supply member such as an AC adapter, for example, may be separately provided for supplying power to the antenna 3.

According to the first embodiment, the receiver 2 further comprises the relay 2g constituted of the coil portion 2e and the switching portion 2f electrically insulated from each other so that the control portion power supply circuit 2c is connected to the control portion 2b and the coil portion 2e of the relay 2g and the antenna power supply circuit 2d is connected to the antenna connection portion 1a through the switching portion 2f of the relay 2g, whereby the control portion power supply circuit 2c supplies power to the control portion 2b and the coil portion 2e while the antenna power supply circuit 2d supplies power to the antenna 3 through the switching portion 2f. Further, the coil portion 2e and the switching portion 2f of the relay 2g are electrically insulated from each other, whereby the receiver 2 can be reliably prevented from a malfunction resulting from a failure in the antenna 3 when the antenna 3 is out of order.

According to the first embodiment, the receiver 2 includes the switching element 2h provided between the control portion power supply circuit 2c and the coil portion 2e of the relay 2g, so that the control portion 2b on-off controls the switching element 2h thereby controlling supply of the current from the control portion power supply circuit 2c to the coil portion 2e of the relay 2g. The control portion 2b further on-off controls the switching portion 2f of the relay 2g following the current flowing to the coil portion 2e of the relay 2g thereby controlling supply of power from the antenna power supply circuit 2d to the antenna 3 through the switching portion 2f of the relay 2g. Therefore, the control portion 2b can on-off control the switching portion 2f of the relay 2g by on-off controlling the switching element 2h. Thus, the control portion 2b can easily on-off control supply of power from the antenna power supply circuit 2d to the antenna 3.

According to the first embodiment, the control portion 2b is so formed as to have the antenna detecting function of detecting whether or not the antenna 3 connected to the receiver 2 is the active antenna 3a, thereby automatically detecting that the antenna 3 connected to the receiver 2 is the active antenna 3a through the antenna detecting function.

According to the first embodiment, the control portion 2b is so formed as to control the antenna power supply circuit 2d to supply power to the antenna 3 through the antenna connection portion 1a when detecting that the antenna 3 connected to the receiver 2 is the active antenna 3 through the antenna detecting function and to control the antenna power supply circuit 2d not to supply power to the antenna connection portion 1a when detecting that the antenna 3 is not the active antenna 3a or the antenna 3 is not connected to the receiver 2 so that the antenna power supply circuit 2d supplies no power to the antenna connection portion 1a when the control portion 2b detects that the antenna 3 is not the active antenna 3a or the antenna 3 is not connected to the receiver 2, whereby power consumption can be reduced.

According to the first embodiment, as hereinabove described, the control portion 2b is so formed as to turn off the switching element 2h so that the control portion power supply circuit 2c stops supplying the current to the coil portion 2e of the relay 2g, the switching portion 2f of the relay 2g enters an ON-state and the antenna power supply circuit 2d supplies power to the antenna 3. Thus, the control portion 2b can easily control whether or not to supply power from the antenna power supply circuit 2d to the antenna 3 by on-off controlling the switching element 2h.

According to the first embodiment, as hereinabove described, the control portion 2b is so formed as to turn on the switching element 2h so that the control portion power supply circuit 2c supplies the current to the coil portion 2e of the relay 2g, the switching portion 2f of the relay 2g enters an OFF-sate and the antenna power supply circuit 2d stops supplying power to the antenna 3. Thus, the control portion 2b can easily control whether or not to supply power from the antenna power supply circuit 2d to the antenna 3 by on-off controlling the switching element 2h.

According to the first embodiment, as hereinabove described, the television set 1 is provided with the display portion 1b capable of displaying television image information and the control portion 2b is so formed as to turn on the switching element 2h so that the control portion power supply circuit 2c supplies the current to the coil portion 2e of the relay 2g, the switching portion 2f of the relay 2g enters an OFF-state and the antenna power supply circuit 2d stops supplying power to the antenna 3 when the display portion 1b is set to display an image other than the television image while the antenna power supply circuit 2d supplies power to the antenna connection portion 1a. Thus, the control portion 2b can easily control the antenna power supply circuit 2d not to supply power to the active antenna 3a by turning on the switching element 2h when setting of the display portion 1b is so changed as not to use the active antenna 3a for displaying an image of a DVD or the like, for example, after the same is set to display the television image.

According to the first embodiment, as hereinabove described, the control portion 2b is so formed as to detect whether or not the antenna 3 is the active antenna 3a by turning off the switching element 2h so that the antenna power supply circuit 2d supplies power to the antenna 3 every time power is supplied to the digital television 1, whereby the control portion 2b can detect whether or not the antenna 3 connected to the digital television 1 is the active antenna 3a every time power is supplied to the digital television 1.

According to the first embodiment, as hereinabove described, the control portion 2b is provided with the receiving sensitivity detecting function of detecting whether or not the antenna 3 connected to the digital television 1 is the active antenna 3a by detecting change in the receiving strength of the signal received from the antenna 3 when turning off the switching element 2h thereby supplying power from the antenna power supply circuit 2d to the antenna 3 through the switching portion 2f and changing the level of the power supplied from the antenna power supply circuit 2d to the antenna 3, thereby easily detecting whether or not the antenna 3 connected to the antenna connection portion 1a is the active antenna 3a by detecting the change in the receiving strength.

(Second Embodiment)

In a receiver 20 according to a second embodiment of the present invention, a control portion 20b detects whether or not an antenna 3 connected to the receiver 20 is an active antenna 3a by determining the level of a detected voltage, dissimilarly to the control portion 2b in the receiver 2 according to the first embodiment detecting whether or not the antenna 3 connected to the receiver 2 is the active antenna 3a by detecting change in the receiving strength in the antenna 3. In the receiver 20 according to the second embodiment, redundant description is not repeated as to portions similar to those of the receiver 2 according to the first embodiment.

Figure 6:
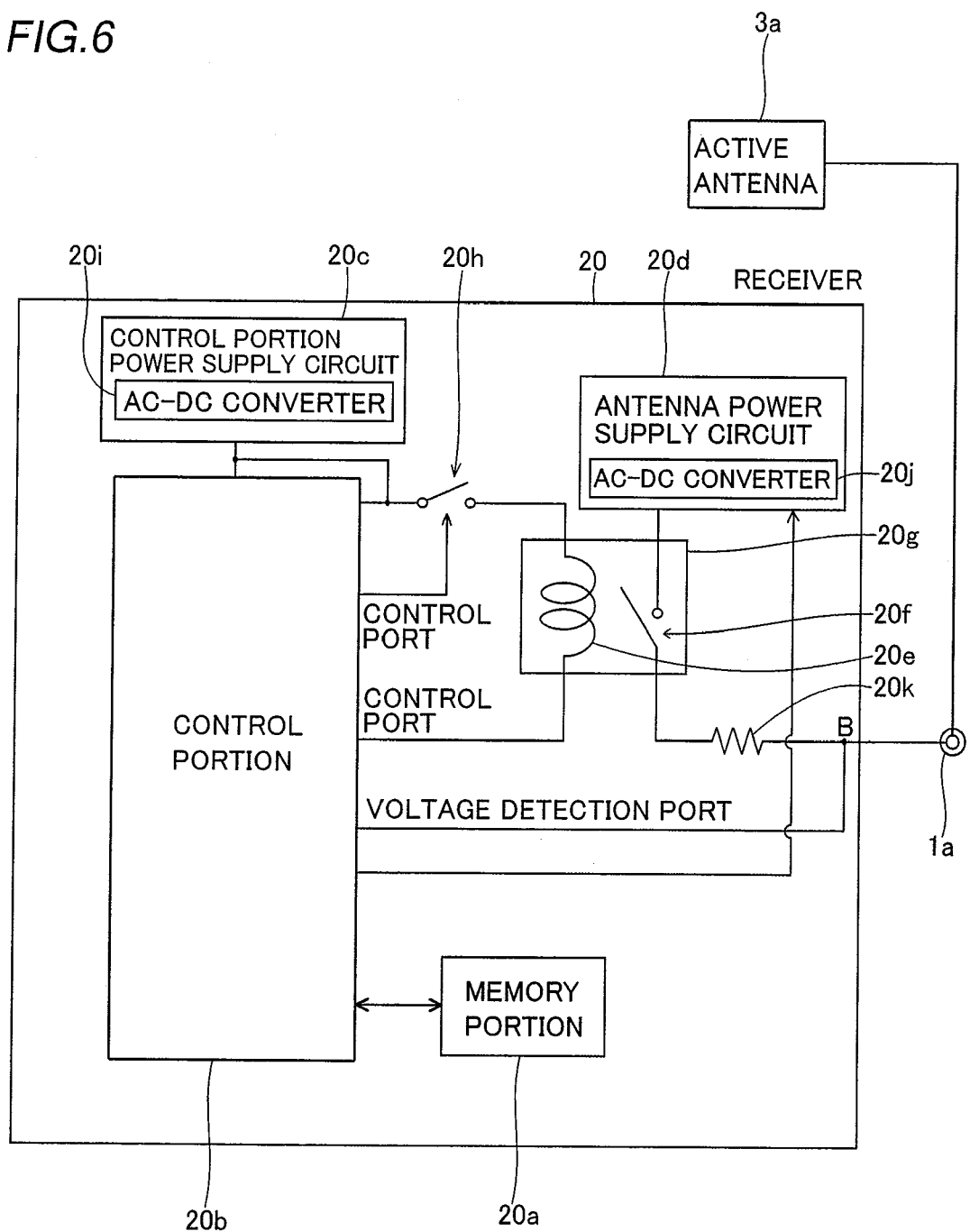
FIG. 6 is a block diagram of a receiver according to a second embodiment of the present invention.

First, the structure of the receiver 20 according to the second embodiment of the present invention is described with reference to FIGS. 1 to 3 and 6. As shown in FIG. 6, the receiver 20 according to the second embodiment of the present invention has a structure obtained by setting a voltage detecting resistance 20k between the switching portion 2f of the relay 2g and the node A (node B in the second embodiment) in the structure (see FIG. 2) of the receiver 2 according to the first embodiment. In other words, the receiver 20 is so formed that power supplied by an antenna power supply circuit 20d reaches the antenna 3 (see FIG. 1) through a switching portion 20f of a relay 20g, the voltage detecting resistance 20k and an antenna connection portion 1a. The voltage detecting resistance 20k is an example of the "resistance portion" in the present invention.

According to the second embodiment, the control portion 20b has an antenna detecting function of detecting whether or not the antenna 3 (see FIG. 1) connected to a digital television 1 is the active antenna 3a, as shown in FIG. 6. The control portion 20b of the receiver 20 according to the second embodiment is so formed as to supply power of a prescribed level from the antenna power supply circuit 20d to the antenna 3 (see FIG. 1) through the antenna connection portion 1a and to detect whether or not the antenna 3 is the active antenna 3a by detecting the level of a voltage at the node B between the voltage detecting resistance 20k and the antenna connection portion 1a.

More specifically, the antenna power supply circuit 20d supplies power consisting of a voltage of about 5 V and a current of about 30 mA. The supplied power reaches the antenna 3 through the switching portion 20f of the relay 20g, the voltage detecting resistance 20k, the node B and the antenna connection portion 1a. At this time, the control portion 20b detects the level of the voltage at the node B, and determines whether or not the connected antenna 3 is the active antenna 3a. The amplification circuit included in the active antenna 3a as described above can be regarded as a constant load. When the active antenna 3a is connected to the antenna connection portion 1a, therefore, the control portion 20b detects a voltage of about 1 V at the node B. On the other hand, a passive antenna 3b (see FIG. 3) includes no amplification circuit as described above, and one side thereof is grounded. When the passive antenna 3b is connected to the antenna connection portion 1a, therefore, the control portion 20b detects a voltage of about 0 V at the node B. When the antenna 3 (the active antenna 3a or the passive antenna 3b) is not connected to the antenna connection portion 1a, it follows that the antenna connection portion 1a is open, whereby no power is supplied to the antenna connection portion 1a, and no current flows to the voltage detecting resistance 20f. Therefore, the control portion 20b detects a voltage of about 5 V at the node B.

As described above, the control portion 20b determines that the antenna 3 connected to the antenna connection portion 1a is the active antenna 3a when the level of the voltage at the node B is about 1 V, and determines that the antenna 3 connected to the antenna connection portion 1a is the passive antenna 3b when the level of the detected voltage is about 0 V. When the level of the detected voltage is about 5 V, the control portion 20b determines that the antenna 3 (the active antenna 3a or the passive antenna 3b) is not connected to the antenna connection portion 1a.

An operation of the receiver 20 according to the second embodiment of the present invention upon power supply is now described with reference to FIGS. 1, 3, 6 and 7. An operation of the control portion 20b of the receiver 20 for controlling the relay 20g and that in a power supply state of the receiver 20 are similar to those in the first embodiment, and hence redundant description is not repeated.

At steps S1 to S6, the control portion 20b operates similarly to the control portion 2b according to the first embodiment as described with reference to FIG. 4. When the antenna power supply circuit 20d supplies the power consisting of a voltage of about 5 V and a current of about 30 mA to the antenna 3 (see FIG. 1) through the antenna connection portion 1a (see FIG. 6) at the step S6, the control portion 20b starts detecting the voltage at the node B at a step S21. When determining that the level of the voltage detected at the step S21 is about 0 V at a step S22, the control portion 20b determines that the antenna 3 connected to the antenna connection portion 1a is not the active antenna 3a at a step S23, and advances to a step S12. At the step S12, the control portion 20b controls the antenna power supply circuit 20d not to supply power to the antenna 3, and terminates the processing. In this case, the antenna 3 connected to the antenna connection portion 1a is conceivably the passive antenna 3b (see FIG. 3), since the detected voltage is about 0 V.

Figure 7:
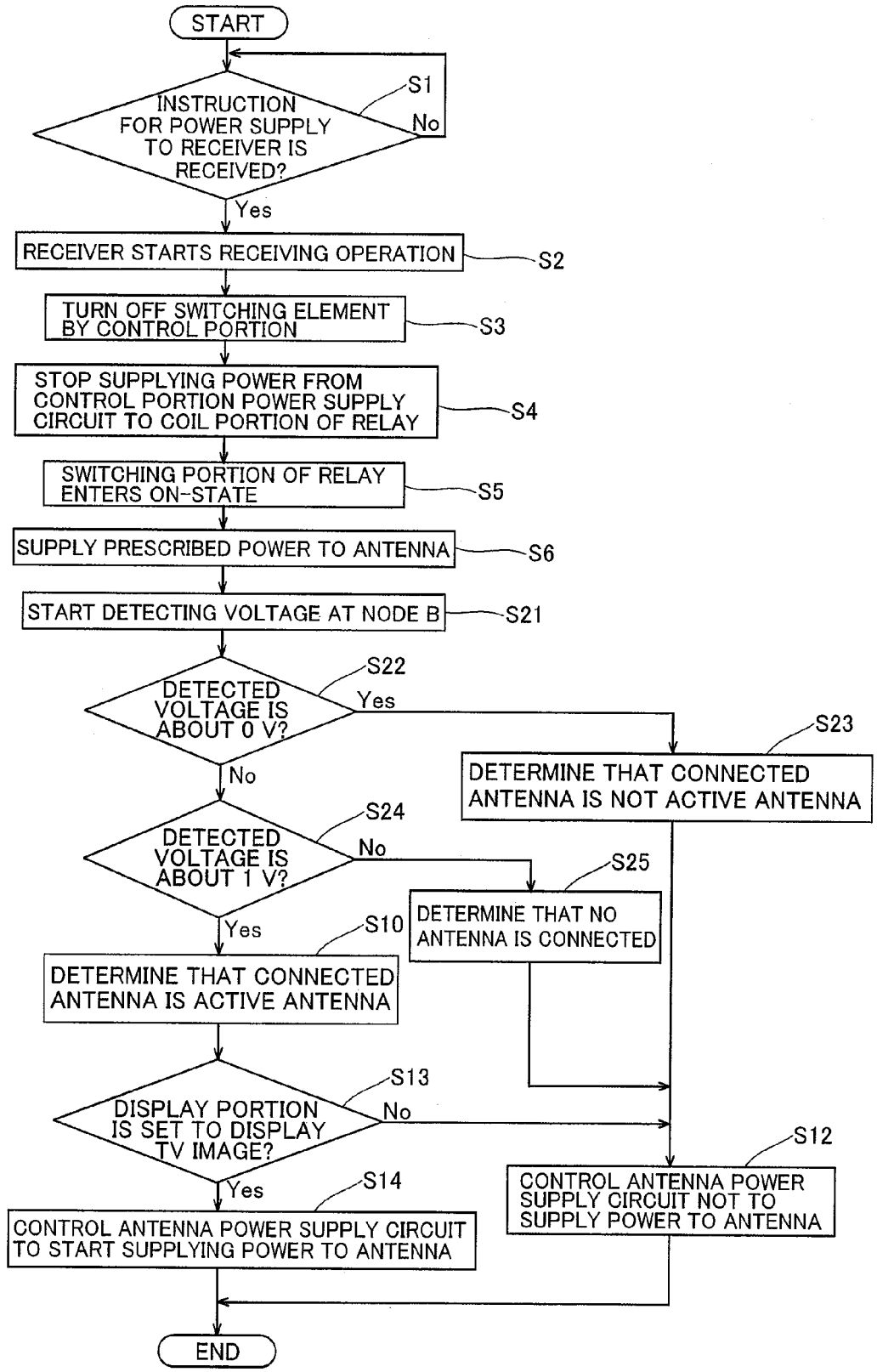
FIG. 7 is a flow chart showing a control flow upon power supply to the receiver according to the second embodiment of the present invention shown in FIG. 6.

When determining that the detected voltage is not about 0 V at the step S22, on the other hand, the control portion 20b determines whether or not the detected voltage is about 1 V at a step S24, as shown in FIG. 7. When determining that the detected voltage is about 1 V at the step S24, the control portion 20b determines that the connected antenna 3 is the active antenna 3a at a step S10.

When determining that the detected voltage is not about 1 V at the step S24, on the other hand, the control portion 20b determines that the antenna 3 is not connected to the antenna connection portion 1a at a step S25. At the step S12, the control portion 20b controls the antenna power supply circuit 20d not to supply power to the antenna 3, and terminates the processing. In this case, the control portion 20b detects a voltage of about 5 V. In other words, the antenna connection portion 1a is conceivably not connected with the antenna 3 but open.

When determining that the connected antenna 3 is the active antenna 3a at the step S10, the control portion 20b advances to a step S13, and thereafter operates similarly to the control portion 2b according to the first embodiment.

According to the second embodiment, as hereinabove described, the voltage detecting resistance 20k is further provided between the antenna power supply circuit 20d and the antenna connection portion 1a and the control portion 20b is so formed as to control the antenna power supply circuit 20d to supply the power consisting of the voltage of about 5 V and the current of about 30 mA to the antenna 3 through the antenna connection portion 1a and to detect whether or not the antenna 3 is the active antenna 3a by detecting the level of the voltage between the voltage detecting resistance 20k and the antenna connection portion 1a thereby detecting whether or not the antenna 3 connected to the antenna connection portion 1a is the active antenna 3a through the level of the detected voltage. Thus, the control portion 20b can automatically detect whether or not the antenna 3 connected to the antenna connection portion 1a is the active antenna 3a.

According to the second embodiment, as hereinabove described, the control portion 20b is so formed as to determine that the antenna 3 connected to the digital television 1 is the active antenna 3a and to keep the switching element 20h in the OFF-state so that the antenna power supply circuit 20d supplies power to the antenna 3 when determining that the voltage between the voltage detecting resistance 20k and the antenna connection portion 1a is about 1 V, whereby the control portion 20b can easily control the antenna power supply circuit 20d to supply power to the antenna 3 when determining that the active antenna 3a is connected to the digital television 1.

According to the second embodiment, as hereinabove described, the control portion 20b is so formed as to determine that the antenna 3 connected to the digital television 1 is the passive antenna 3b and to turn on the switching element 20h so that the antenna power supply circuit 20d supplies no power to the antenna 3 when determining that the voltage between the voltage detecting resistance 20k and the antenna connection portion 1a is about 0 V corresponding to the ground potential, thereby easily controlling the antenna power supply circuit 20d not to supply power to the antenna 3 when determining that the passive antenna 3b is connected to the digital television 1.

According to the second embodiment, as hereinabove described, the control portion 20b determines that the antenna 3 is not connected to the digital television 1 and turns on the switching element 20h so that the antenna power supply circuit 20d supplies no power to the antenna connection portion 1a when determining that the voltage between the voltage detecting resistance 20k and the antenna connection portion 1a is about 5 V. According to this structure, the control portion 20b can easily control the antenna power supply circuit 20d not to supply power to the antenna connection portion 1a when determining that the antenna 3 is not connected to the digital television 1.

Although the present invention has been described and illustrated in detail, it is clearly understood that the same is by way of illustration and example only and is not to be taken by way of limitation, the spirit and scope of the present invention being limited only by the terms of the appended claims.

For example, while the control portion turns off the switching portion by feeding the current to the coil portion of the relay in each of the aforementioned first and second embodiments, the present invention is not restricted to this but the control portion may alternatively turn on the switching portion by feeding a current to the coil portion of the relay.

While the control portion automatically controls the antenna power supply circuit not to supply power to the antenna when detecting that the active antenna is not connected to the antenna connection portion in each of the aforementioned first and second embodiments, the present invention is not restricted to this but the control portion may alternatively prompt the user to select whether or not to supply power to the antenna when detecting that the active antenna is not connected to the antenna connection portion.

What is claimed is:

1. A receiver comprising:
a receiver body including an antenna connection portion connected with an antenna;
a control portion controlling said receiver body;
a first internal power source provided on said receiver body for supplying power to said control portion; and
a second internal power source provided on said receiver body to be electrically insulated from said first internal power source for supplying power to said antenna, wherein
said control portion has an antenna detecting function of detecting whether or not said antenna connected to said receiver body is an active antenna, and
said control portion controls said second internal power source to supply power to said antenna through said antenna connection portion when detecting that said antenna connected to said receiver body is said active antenna through said antenna detecting function and controls said second internal power source not to supply power to said antenna connection portion when detecting that said antenna is not said active antenna or detecting that said antenna is not connected to said receiver body.

2. The receiver according to claim 1, wherein
said receiver body further includes a relay constituted of a coil portion and a first switching portion electrically insulated from each other, and
said first internal power source is connected to said coil portion of said relay while said second internal power source is connected to said antenna connection portion through said first switching portion of said relay.

3. The receiver according to claim 2, wherein
said receiver body further includes a second switching portion provided between said first internal power source and said coil portion of said relay, and
said control portion is so formed as to on-off control said second switching portion thereby controlling supply of a current from said first internal power source to said coil portion of said relay and to on-off control said first switching portion of said relay following said current flowing to said coil portion of said relay thereby controlling supply of power from said second internal power source to said antenna through said first switching portion of said relay.

4. The receiver according to claim 2, wherein
said first switching portion of said relay is so formed as to enter an ON-state when said first internal power source stops supplying power to said coil portion of said relay so that said second internal power source supplies power to said antenna.

5. The receiver according to claim 3, wherein
said control portion is so formed as to turn off said second switching portion so that said first internal power source stops supplying said current to said coil portion of said relay thereby turning on said first switching portion of said relay so that said second internal power source supplies power to said antenna.

6. The receiver according to claim 5, wherein
said control portion turns on said second switching portion so that said first internal power source supplies said current to said coil portion of said relay and turns off said first switching portion of said relay so that said second internal power source stops supplying power to said antenna.

7. The receiver according to claim 3, further comprising a display portion capable of displaying television image information, wherein
said control portion turns on said second switching portion so that said first internal power source supplies said current to said coil portion of said relay and turns off said first switching portion of said relay so that said second internal power source stops supplying power to said antenna if said display portion is set to display an image other than a television image when said second internal power source supplies power to said antenna connection portion.

8. The receiver according to claim 3, wherein
said control portion detects whether or not said antenna is said active antenna by turning off said second switching portion so that said second internal power source supplies power to said antenna every time power is supplied to said receiver body.

9. The receiver according to claim 8, wherein
said control portion has a receiving sensitivity detecting function of detecting whether or not said antenna connected to said receiver body is said active antenna by detecting change in receiving strength of a signal received from said antenna when turning off said second switching portion so that said second internal power source supplies power to said antenna through said first switching portion and changing the level of power supplied from said second internal power source to said antenna.

10. The receiver according to claim 8, further comprising a resistance portion provided between said second internal power source and said antenna connection portion, wherein
said control portion is so formed as to turn off said second switching portion so that said second internal power source supplies power to said antenna through said first switching portion thereby supplying power of a prescribed level from said second internal power source to said antenna through said antenna connection portion and to detect whether or not said antenna is said active antenna by detecting the level of a voltage between said resistance portion and said antenna connection portion through said antenna detecting function.

11. The receiver according to claim 10, wherein
said control portion determines that said antenna connected to said receiver body is said active antenna and maintains said second switching portion in the OFF-state so that said second internal power source supplies power to said antenna when determining that said voltage between said resistance portion and said antenna connection portion is a first voltage.

12. The receiver according to claim 10, wherein
said control portion determines that said antenna connected to said receiver body is a passive antenna and turns on said second switching portion thereby controlling said second internal power source not to supply power to said antenna when determining that said voltage between said resistance portion and said antenna connection portion is the ground potential.

13. The receiver according to claim 10, wherein
said control portion determines that said antenna is not connected to said receiver body and turns on said second switching portion thereby controlling said second internal power source not to supply power to said antenna when determining that said voltage between said resistance portion and said antenna connection portion is a second voltage.

14. A television set comprising:
a receiver including an antenna connection portion connected with an antenna, a control portion, a first internal power source supplying power to said control portion and a second internal power source provided to be electrically insulated from said first internal power source for supplying power to said antenna; and
a display portion displaying an image received by said receiver, wherein
said control portion has an antenna detecting function of detecting whether or not said antenna connected to said receiver body is an active antenna, and
said control portion controls said second internal power source to supply power to said antenna through said antenna connection portion when detecting that said antenna connected to said receiver body is said active antenna through said antenna detecting function and controls said second internal power source not to supply power to said antenna connection portion when detecting that said antenna is not said active antenna or detecting that said antenna is not connected to said receiver body.

* * * * *